United States Patent [19]

Menyhert

[11] Patent Number: 5,198,104
[45] Date of Patent: Mar. 30, 1993

[54] APPARATUS FOR REMOVING SOLID AND VOLATILE CONTAMINANTS FROM LIQUIDS

[75] Inventor: W. R. Menyhert, St. Petersburg Beach, Fla.

[73] Assignee: Lubrication Technologies, Inc., Tampa, Fla.

[21] Appl. No.: 667,949

[22] Filed: Mar. 12, 1991

[51] Int. Cl.$^5$ .......................... B01D 3/28; B01D 27/08
[52] U.S. Cl. .................................. 210/149; 210/180; 210/181; 210/183; 210/249; 210/317; 210/450; 210/484; 210/489; 196/46.1; 196/115; 196/121; 196/128
[58] Field of Search ............... 210/149, 180, 181, 183, 210/249, 335, 450, 489, 314, 317, 484; 248/184, 311.2; 159/13.1, 28.1; 203/DIG. 16; 196/46.1, 115, 121, 128

[56] References Cited

U.S. PATENT DOCUMENTS 4,289,583 9/1981 Engel ................................. 210/180
4,443,334 4/1984 Shugarman et al. ................ 210/180

*Primary Examiner*—Robert A. Dawson
*Assistant Examiner*—Matthew O. Savage
*Attorney, Agent, or Firm*—Joseph C. Mason, Jr.; Ronald E. Smith

[57] ABSTRACT

A device that reclaims industrial fluids. Solid contaminants are removed from the liquid being reclaimed by a series of increasingly fine filter elements positioned within a filter housing. The substantially solid contaminant-free fluid then enters an evaporation chamber having a design that constrains the fluid to form a thin film atop an evaporation plate at the bottom of the chamber to facilitate evaporation of volatile contaminants. Insert members are positioned within the evaporation chamber to increase the surface area of the thin film to further enhance the removal of the volatile contaminants. The temperature and pressure of the evaporation chamber is controlled by a heating element that is under the control of a temperature sensor. Evaporated volatile contaminants escape the evaporation chamber through a port formed in the head that closes the device. Latches are used to secure the head in the absence of conventional nuts and bolts, and the head screw threadedly engages the evaporation plate. The device is adapted to hang freely so that it is held level by gravity to insure that the fluid is evenly distributed.

17 Claims, 4 Drawing Sheets

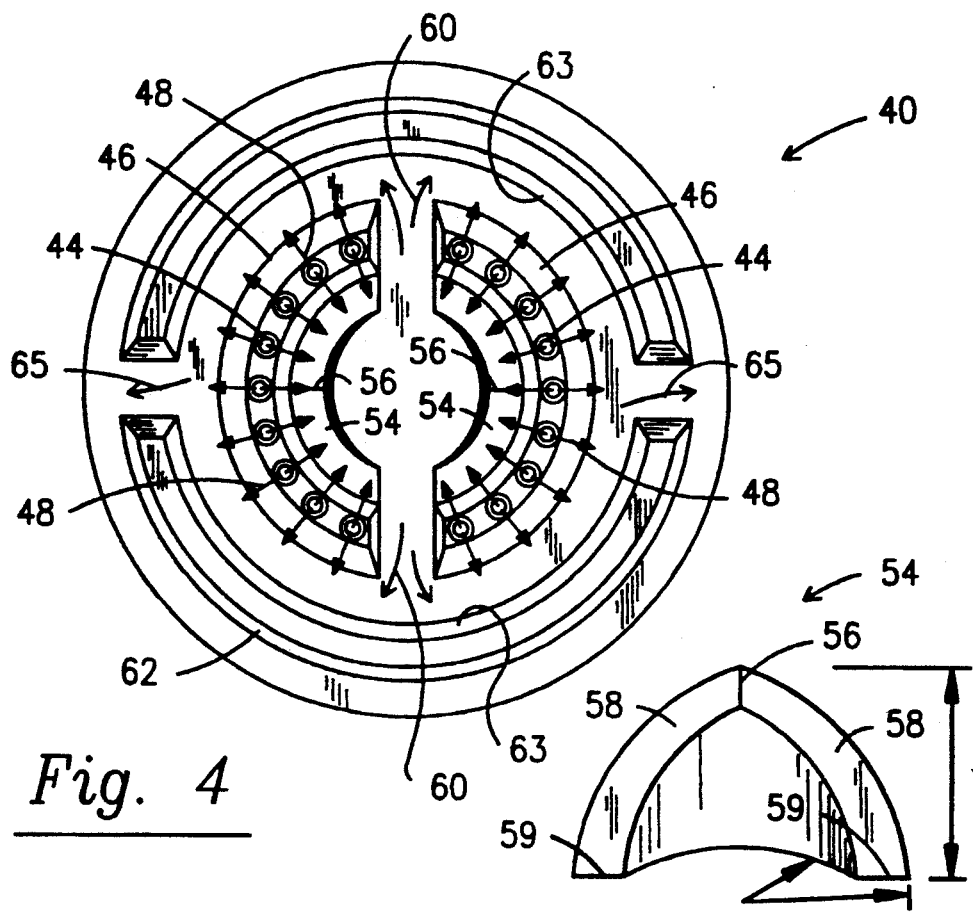
Fig. 4
Fig. 5
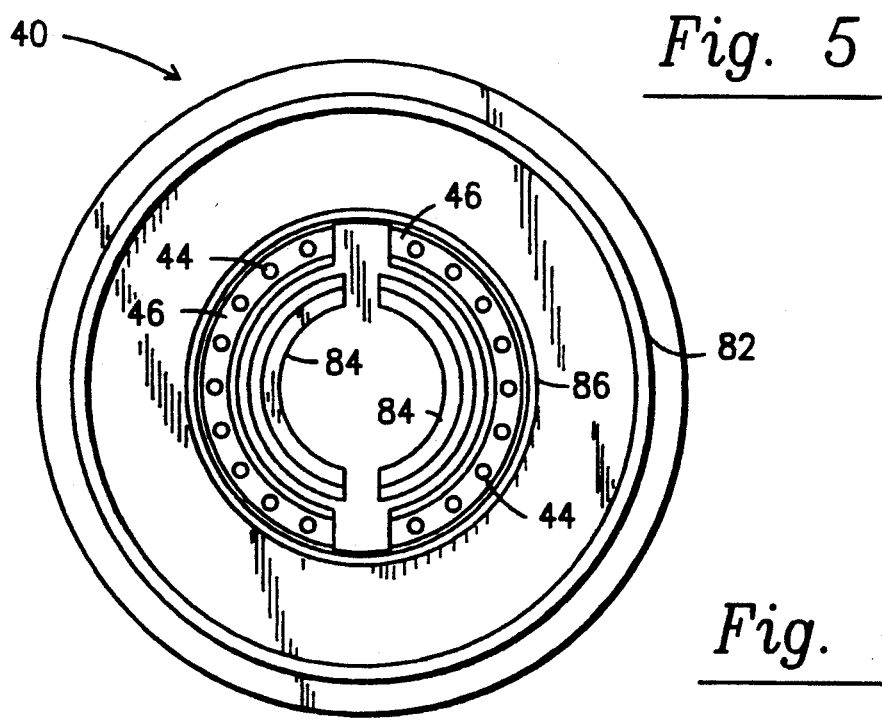
Fig. 6

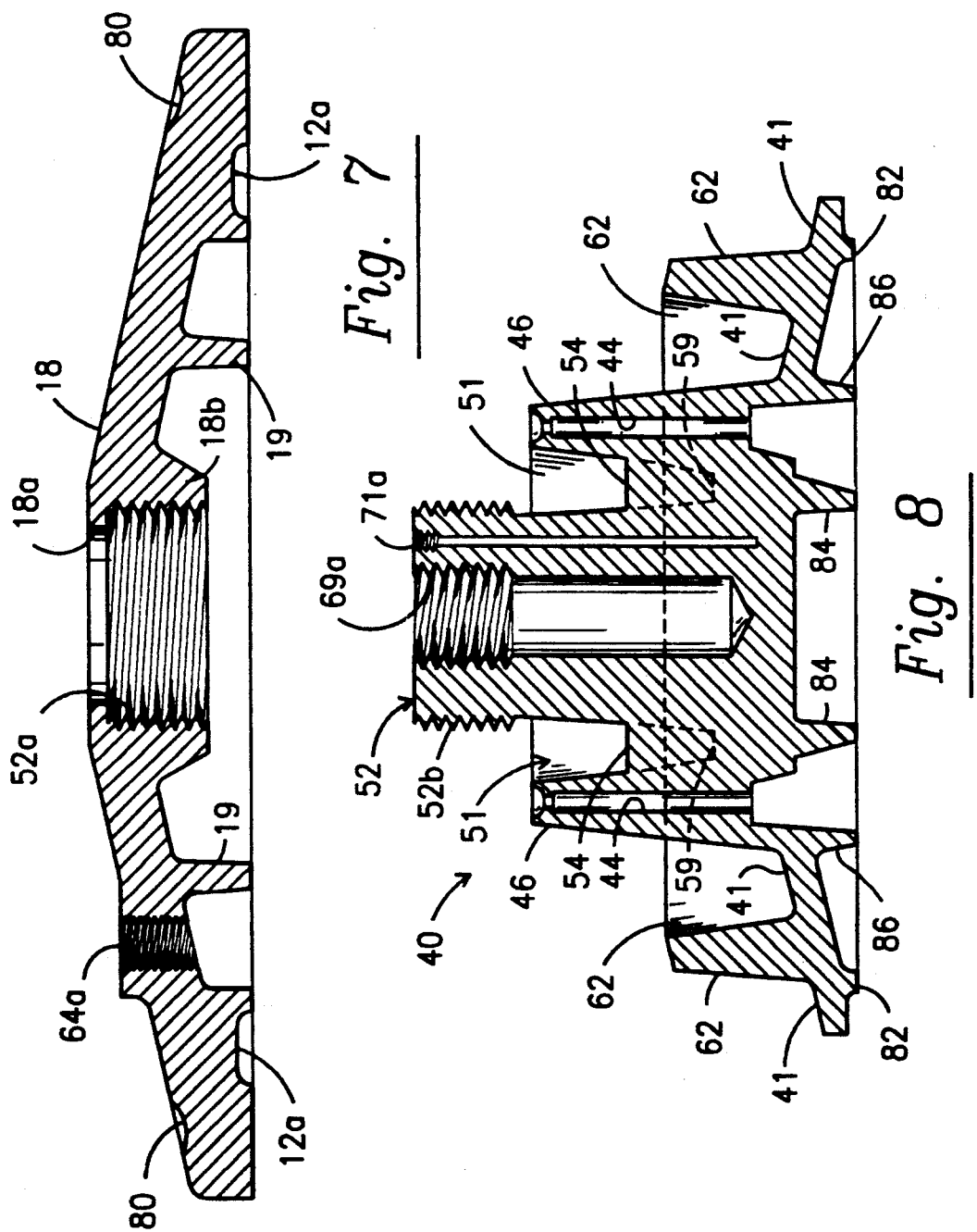

APPARATUS FOR REMOVING SOLID AND VOLATILE CONTAMINANTS FROM LIQUIDS

TECHNICAL FIELD

This invention relates, generally, to a method for reclaiming industrial fluids and an apparatus that performs the steps of the method.

BACKGROUND ART

Several devices have been observed that have utility in removing solids, liquid fluids and gaseous fluids from liquid fluids such as lubricants, oil, diesel fluids, hydraulic fluid, and the like. Typically, the known devices remove contaminants such as solids by filtration and said devices remove oxidizing or reducing agents through evaporation. U.S. Pat. Nos. showing such devices include 4,289,583, 4,227,969, 4,189,351, 4,006,084, and 4,115,201. U.K. pat. no. 1,424,625 is also of interest.

The devices disclosed in the foregoing patents, and all other devices known to the present inventors, often succeed in removing at least some contaminants from the liquid fluid being reclaimed, but all of the known devices leave at least some contaminants in the fluid. The poorly designed devices leave an unacceptably high amount of contaminants in the fluid. Even the better designed devices have a number of shortcomings.

Typically, the better designed devices include an evaporation plate and chamber area into which the fluid to be reclaimed is introduced, and means are provided for heating the fluid to temperatures between 180 degrees Fahrenheit and 220 degrees Fahrenheit. At pressures below atmospheric pressure, many volatile compounds will evaporate at these temperatures.

However, even these devices are inadequate because they either do not take into consideration a number of variables that affect evaporation, or such variables are considered but not properly controlled.

For example, adequate temperature control has not been observed in the art. Many of the known devices do not provide even heat distribution; this results in uneven evaporation. Some of the devices provide acceptable temperature gradients throughout the liquid, but only if the device is held perfectly level during the reclamation process. Real world conditions seldom permit such ideal laboratory conditions and those reclamation devices that function properly only when held perfectly level have little practical utility.

The earlier devices also lack adequate pressure control within the evaporation chamber and within the filter chamber.

Moreover, the earlier devices are not adapted to handle fluids of differing viscosities; when a wide variety of fluids of differing viscosities are handled by the heretofore known devices, the fluids sometimes burn and the devices eventually become clogged and inoperative.

Moreover, some units lack adequate means for removing volatile organic gases from the evaporation chamber, and include heating elements that are directly exposed to such explosive gases. Needless to say, such devices are dangerous.

Clogged jets are also common in the earlier devices because solid particulate matter is inadequately filtered; the clogged jets lower the flow rate through the chamber and, when coupled with inadequate temperature control, lead to burning of the fluids in the chamber. The art has observed that the fluid burns quite easily because a thin film thereof forms on the walls of the evaporator chamber, but no effective means has heretofore been found to overcome the interrelated problems of clogged jets, reduced flow rates, and burning fluids.

Another less serious but troublesome shortcoming of the heretofore known devices relates to the structural aspect of such devices: they include closure means that are bolted to the canisters that hold the filtration media. Thus, facile replacement of the media is not available.

The prior art, when considered as a whole in accordance with the requirements of law, neither teaches nor suggests better methods and devices for reclaiming industrial fluids. The conventional wisdom is that the art has already reached its highest level of development, and that future developments will be limited to minor refinements of the known devices.

DISCLOSURE OF INVENTION

The longstanding but heretofore unfulfilled need for an improved reclamation device is now fulfilled by a highly novel device that includes a temperature and pressure-controlled evaporation chamber, that prevents film formation of volatile liquids on the chamber walls, that constrains the fluids being reclaimed to follow a novel path of travel through the chamber and which causes such fluid to form a thin unbroken film as it enters the evaporation chamber to thereby enhance evaporation of contaminants.

A number of advances have also been made in the physical structure of the device, such as improved means for holding the device together that does not rely upon nuts and bolts and which therefore facilitates changing of the filtration media, a seal between the head and evaporation plate that constrains volatile components to follow a predetermined path of travel to an exit, and means maintaining the device in a level plane.

Still further improvements relate to the use of the filtering media within the novel device. The filtering materials are selected for their specific surface ionization potential and their wet and dry fiber collapse characteristics. Suitable synthetic fibers include Orlon, Dacron, and Kevlar. Suitable natural fibers include cotton.

More particularly, the novel device is provided in the form of a cylindrical canister that slidably receives a filter housing. Three layers of increasingly fine filter material are positioned within the filter housing.

The top wall of the filter housing has plural apertures formed therein through which the filtered fluid flows.

A novel evaporation plate overlies the filter housing top wall and has unique upstanding chimney members formed therein that are bored to provide a passageway for fluid to flow into an evaporation chamber that lies below the head that closes the canister and which screw threadedly engages the evaporation plate.

The evaporation plate has a thick, upwardly projecting central hub and a blind bore is formed centrally of said hub for receiving a heating element. A second blind bore is also formed in the hub radially outwardly of the first bore and a temperature sensor is positioned within that second bore.

A first port is formed in the head and provides a vent to ambient for evaporated volatile contaminants and a second port is formed in the canister and allows the reclaimed fluid to return to the system within which is circulates.

Plural circumferentially spaced latch members hold the head into closing relation with the canister and the head and evaporation plate screw threadedly engage one another. Thus, the device can be assembled and disassembled quickly.

It is therefore understood that the primary object of this invention is to advance the art of industrial fluid reclamation devices.

A more specific object is to provide a reclamation device that is temperature and pressure controlled and that provides an even temperature gradient inside the evaporation chamber.

Still another object is to provide a reclamation device having filtering media that are specifically selected for optimal performance with the fluid being reclaimed.

Another object is to provide a reclamation device that is structured so as to constrain the fluid flowing therein to form a thin film in the evaporation chamber so that the evaporation process is enhanced.

These and other important objects, advantages, and features of the invention will become apparent as this description proceeds.

The invention accordingly comprises the features of construction, combination of elements and arrangements of parts that will be exemplified in the construction set forth hereinafter and the scope of the invention will be set forth in the claims.

BRIEF DESCRIPTION OF THE DRAWINGS

For a fuller understanding of the nature and objects of the invention, reference should be made to the following detailed description, taken in connection with the accompanying drawings, in which:

FIG. 4 is a top plan view of the novel evaporation plate showing the two semicircular chimneys with plural passageways formed therein;

FIG. 5 is a perspective view of an insert of the type used to increase the surface area of the evaporation chamber;

FIG. 6 is a bottom plan view of the evaporation plate;

FIG. 7 is a sectional view of the head in side elevation; and

FIG. 8 is a sectional view of the evaporation plate.

BEST MODES FOR CARRYING OUT THE INVENTION

Figure 1A:
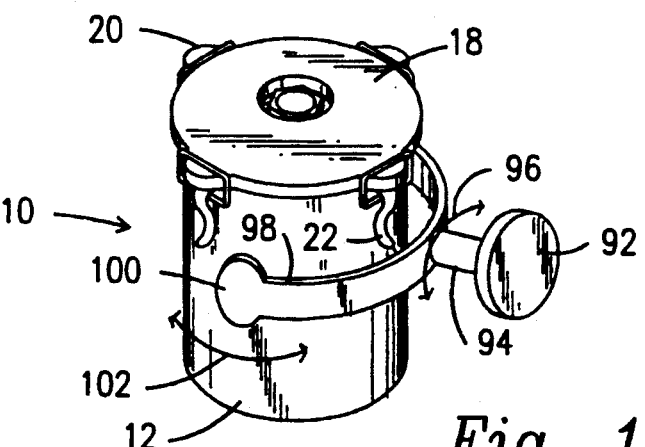
FIG. 1A is a perspective view that depicts the apparatus that allows the device to hang freely in a horizontal plane independently of the orientation of the machinery to which it may be attached.
Figure 1:
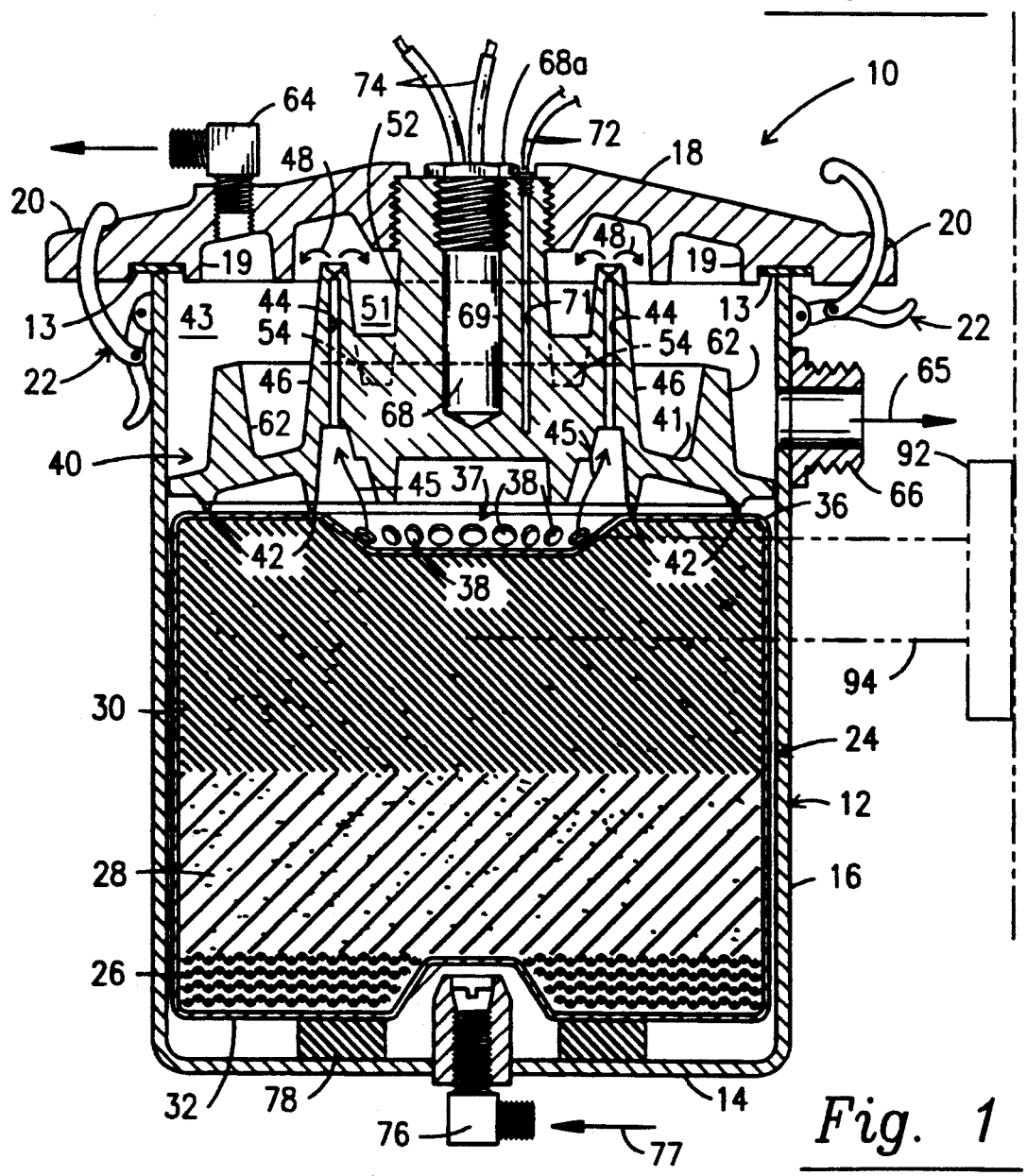
FIG. 1 is a sectional view showing a preferred embodiment of the reclamation device in side elevation.

Referring now to FIG. 1, it will there be seen that an exemplary embodiment of the present invention is denoted as a whole by the reference numeral 10.

Reclamation device 10 includes a canister 12 having a circular bottom wall 14 with cylindrical side walls 16 mounted about the periphery thereof and projecting upwardly therefrom to define an open-topped cavity therebetween.

A lid or canister head 18 provides the closure means for selectively closing the container. Head 18 includes a plurality of radially outwardly extending, circumferentially spaced lobes, collectively denoted 20 (best shown in FIG. 2); plural circumferentially spaced latch members, collectively denoted 22, engage their associated lobes 20 and secure the head in its canister-closing position. In FIG. 1, the latch on the left side of the drawing is shown in its latched position, whereas the latch on the right side of the drawing is shown in its unlatched position, it being understood that all latches would be secured when device 10 is in operation.

Figure 2:
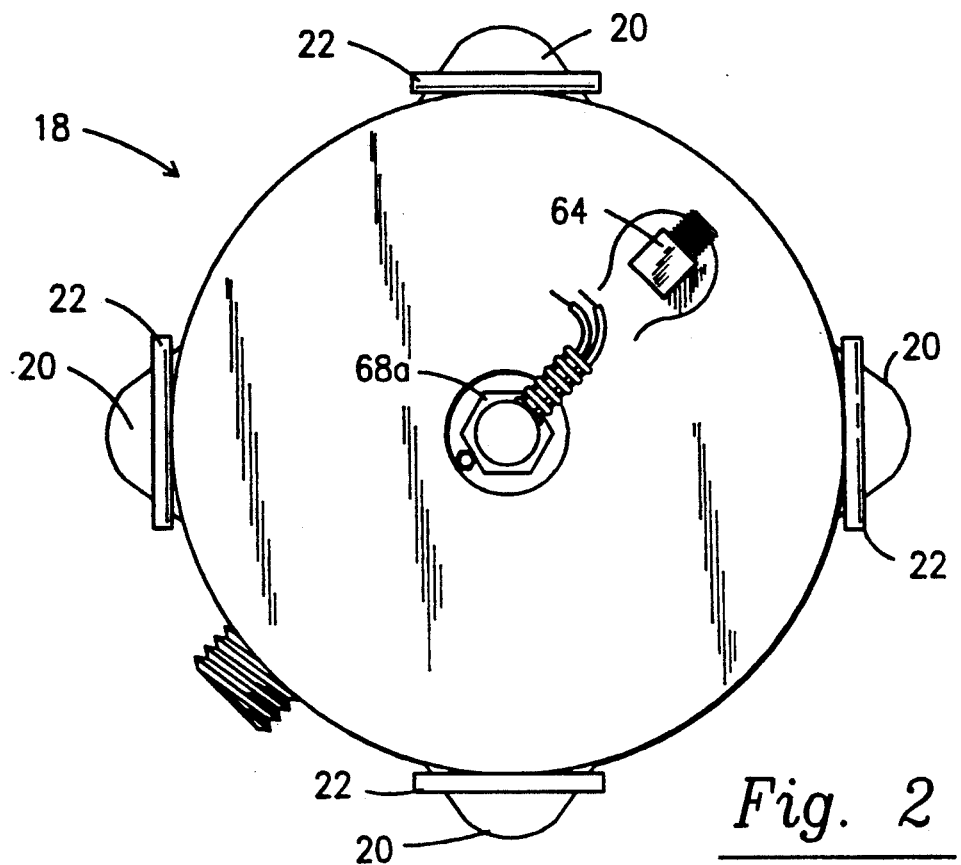
FIG. 2 is a top plan view of the closure means or head of the device.

As shown in FIG. 2, there may be four of said latches 22, each of which may include a pair of pivotally interconnected link arms as depicted in FIG. 1. Note that the linkage includes a cam over center arrangement so that the head cannot be inadvertently unlocked once the latch is in its over center position.

Filter housing 24, as shown in FIG. 1, is slidably disposed within canister 12 when device 10 is assembled.

In the preferred embodiment, there are three different filter materials position within filter housing 24, all of which remove solid particulate materials from the fluid being reclaimed. A relatively thin layer of filter mesh material 26 is positioned at the bottom of the canister and removes relatively large particles from the fluid. A thicker layer of fine filter material 28 is positioned in overlying relation to mesh 26, and removes smaller particles. An even thicker layer of ultra-fine filter material 30 overlies fine filter material 28 and is effective to remove very small particles.

Filtering media 26, 28 and 30 may be formed of natural or synthetic fibers, or combinations thereof. Importantly, the filtration media is selected for use with the particular industrial fluid being reclaimed. More particularly, the filtration materials are selected for their specific surface ionization potential and their fiber collapse characteristics. Suitable synthetic fibers include Orlon, Dacron and Kevlar (trademarks). Suitable natural fibers include cotton and other carbon-based filtration media. By matching the filtration media to the fluid being reclaimed, considerable efficiencies are realized. For example, all three filtering media, 26, 28, 30 also remove certain ions in addition to solid contaminants. The amount of ions removed is dependent upon the specific filter media selected, since differing media exhibit differing surface ion potentials. Those media having positive ion potential will remove negative ions from the fluid being reclaimed, and those media having negative ion potential will remove positive ions from the liquid being reclaimed. Thus, if a fluid to be reclaimed has contaminants of positive ion structure, a filtration media having negative ion potential is selected.

Filter housing 24 includes circular bottom wall 32, cylindrical side wall 34, and top wall 36. Top wall 36 has a circular concavity 37 formed therein, centrally thereof, as depicted in FIG. 1, and a plurality of circumferentially spaced apart apertures 38 are formed therein as depicted. Apertures 38 provide exit passageways, for the fluid being reclaimed, from the filter media, and are referred to as first fluid passageway means in the claims that follow.

An evaporation plate 40 overlies top wall 36 of filter housing 24 and a pair of concentric annular rubber seals 42 constrains filtered, substantially solid-free fluid flowing upwardly through apertures 38 to enter evaporation chamber 43 through elongated vertical passageways 44 formed in chimneys 46, said upward flow being denoted by single-headed directional arrows 45. Passageways 44 are referred to as second fluid passageway means in the claims.

As best shown in FIG. 4, chimneys 46 are two in number and each has a semicircular configuration. However, said multiple passageways 44 are formed therein, as best depicted in FIG. 4, and this results in the even distribution of a thin film of fluid that flows onto evaporation plate 40 as indicated by arrows 48 in FIGS. 1 and 4.

It is important to note that evaporation plate 40 includes an upwardly projecting central hub 52 (FIG. 1). The diameter of central hub 52 is less than the diameter of the central space surrounded by the chimneys 46. Thus, an annular space 51 surrounds depending hub 52 and fluid could flow in a thin film into said annular space and be evaporated therefrom.

However, enhanced evaporation occurs when a fluid to be evaporated is spread out over a large surface area, i.e., the rate of evaporation and the surface area occupied by the fluid to be evaporated are directly proportional to one another. The present invention provides novel insert means for increasing the surface area of the space radially outwardly of hub 52 and radially inward of chimneys 46, and said insert means 54 are depicted in FIGS. 1, 4 and 5.

As perhaps best understood in connection with FIGS. 1 and 4, two inserts 54 are provided and both of them are of semicircular configuration when seen in plan view and accordingly at least partially occupy the space 51 between the chimneys 46 and hub 52 as aforesaid. Although referred to as inserts, members 54 are integrally formed with evaporation plate 40.

As best shown in FIG. 5, each insert 54 has a central apex 56 and downwardly sloping walls 58 that extend in opposite directions therefrom. The vertical extent of the apex 56 is about ¾ that of chimneys 46. The lowermost end 59 of each downwardly sloping wall 58 is flush with the top of evaporation plate 40, and liquid flowing down said sloping walls flows radially outwardly of the chimneys as indicated by directional arrows 60 in FIG. 4.

Another pair of upwardly projecting semicircular members, collectively denoted 62, are positioned radially outwardly of chimneys 40. These members at least partially retain the fluid being reclaimed between chimneys 46 and such members, thereby preventing unwanted formation of a thin film on the chamber walls. The bight regions 63 of each of said members 62 is positioned in the path of travel of fluid flowing radially outwardly from inserts 54 as denoted by said arrows 60, and constrains said fluid to flow around the top of the evaporation plate 40 as indicated by said directional arrows 60, thereby further insuring that a thin film of the fluid will be formed atop said evaporation plate.

Vaporized contaminants are constrained to exit evaporation chamber 43 through vapor port 64 (FIG. 1) formed in head 18. Reclaimed fluid eventually flows between semicircular members 62, as indicated by arrows 65 in FIG. 4, and then exits unit 10 through a fluid return port 66 (FIG. 1). Fluid exiting return port 66 may be directed back to the engine or other item of machinery being lubricated by the fluid, or may be returned to unit 10 for another pass therethrough if the application requires multiple filtering cycles. Note that if the novel device is positioned within an automotive engine, sufficient pressure will be supplied to drive the fluid through the unit. However, in those applications lacking such pressure, an external pump may be provided.

The temperature of the evaporation chamber 43 is controlled by a heating element 68 (FIG. 1) and a thermistor heat sensor 70. Element 68 extends into a first blind cavity or well 69 formed in hub 52 of evaporation plate 40; the cavity is internally threaded near its mouth as shown in FIG. 1 and heating element 68 is externally threaded as shown so that said heating element is screw threadedly engaged to evaporation plate 40 when the device is assembled.

Heat sensor 70 is similarly screw threadedly engaged to head 18 and extends into a second elongate narrow blind cavity 71 that extends between heating element 68 and the space 51 occupied in part by said surface area—increasing inserts 54. Sensor 70 is conductively coupled as at 72 to means for shutting off heating element 68 so that the temperature and hence the pressure of the evaporation chamber 43 is controllable within a predetermined range. Element 68 is conductively coupled as at 74 to a source of electrical power, said source being under the control of sensor 70 as aforesaid.

Fluid to be reclaimed, indicated by directional arrow 77, enters device 10 through entrance port 76 which is positioned at the bottom of the unit as depicted in FIG. 1. An annular seal 78 prevents the fluid from flowing into the space between the canister bottom wall 14 and the filter bottom wall 32, and constrains the fluid to flow first through the filter mesh material 26 and to thereafter follow the path of travel set forth above.

Figure 3:
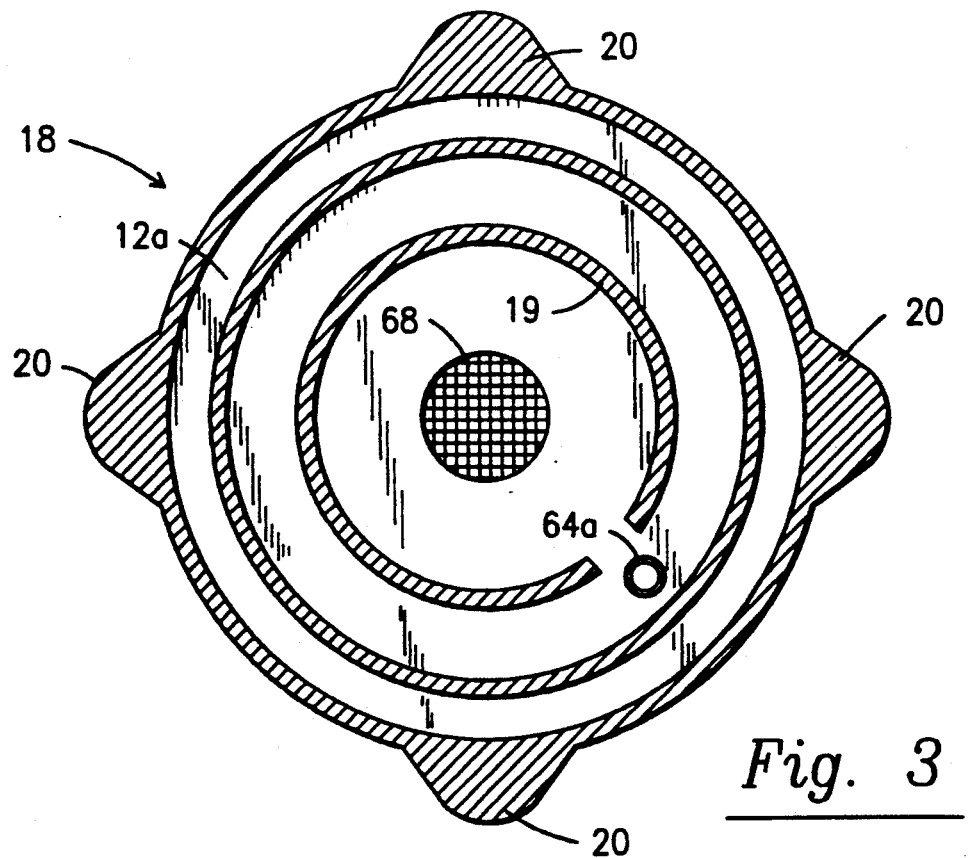
FIG. 3 is a bottom plan view of said head.

Head 18 is shown in top plan and bottom plan view, respectively, in FIGS. 2 and 3; the parts thereof have already been identified.

FIGS. 4 and 6 provide top plan and bottom plan views of evaporation plate 40, and FIGS. 7 and 8 show head 18 and evaporation plate 40, respectively, in sectional views.

Further structural details of head 18 are best pointed out in connection with FIG. 7 and include a depending or downwardly extending central hub 18b, and recesses 80 formed on the outer perimenter of head 18; said recesses accommodate latches 22. Internally threaded bore 64a engages vapor port 64. Internal threads 52a formed in said central hub 18b engage the external threads 52b (FIG. 8) formed on hub 52 of evaporation plate 40. Central opening 18a, formed in hub 18b, accommodates nut 68a (FIG. 1) of heating element 68. Annular groove 12a (FIG. 7) receives gasket 13 (FIG. 1) against which is seated the uppermost peripheral edge or rim of canister 12 as is clearly depicted in FIG. 1. Head 18 further includes integral annular strengthening rib 19.

Further structural details of evaporation plate 40 are best pointed out in connection with FIG. 8. Note that plate 40 has three annular points of contact with top wall 36 of filter housing 24: outer annular ridge 82, inner annular ridge 84, and intermediate annular ridge 86. Note that ridge 84 has the greatest extent, and that ridges 86 and 82 are progressively shorter. This is because of the important convex curvature of floor 41 of evaporation plate 40, i.e., floor 41 slopes downwardly in all directions as it extends radially outwardly as is apparent in FIGS. 1 and 8. This convexity harnesses the influence of gravity to spread the fluid in a thin film atop said floor 41 to better enhance the evaporation therefrom of unwanted contaminants.

The concentric annular seals, collectively denoted 42 in FIG. 1, underlie ridges 82 and 86. External threads 52b of hub 52 (FIG. 8) screw threadedly engage internal threads 52a of head 18 (FIG. 7) when device 10 is assembled. Internal threads 69a of heating element well 69 engage the external threads of the heating element 68, and the internal threads 71a of sensor well 71 engage the external threads of sensor 70.

As shown in FIG. 1, device 10 may be mounted to a vertical support surface 90, said surface being a structural part of an automobile or other item of machinery. Since support surface 90 may change its orientation, novel gimbal means are provided to maintain device 10 in a horizontal plane at all times, independent of the orientation of support surface 90; such means is shown in FIG. 1A. A mounting plate 92 of any predetermined geometrical configuration is non-rotatably affixed to support surface 90 by any suitable means. A shaft 94 is journaled thereto, centrally thereof, and is accordingly free to rotate in either direction about its longitudinal axis of symmetry as indicated by the double-headed reference arrow 96. Shaft 94 is welded or otherwise non-rotatably secured as at 97 to semicircular member 98, and said member 98 is pivotally secured at its opposite ends to associated axle pin members 100, only one of which is visible in FIG. 1A, to enable rotation of device 10 about the axis of rotation of said pins 100, as indicated by the double headed directional arrow 102.

This invention is clearly new and useful. Moreover, it was not obvious to those of ordinary skill at the time it was made in view of the prior art considered as a whole in accordance with the requirements of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A fluid reclamation device, comprising:
   a canister having an open top;
   a closure means for closing said open top of said canister;
   a filter housing positioned within said canister, said filter housing containing filter media therein;
   said canister including means for directing said fluid into said filter housing;
   an evaporation plate positioned within said canister in overlying relation to said filter housing;
   means for heating said evaporation plate;
   said evaporation plate having a top surface adjacent said open top and there being a space between said evaporation plate and said filter housing;
   an evaporation chamber between said closure means and said evaporation plate;
   said closure means including vapor outlet means for venting vapor from said evaporation chamber;
   said canister including outlet means for directing fluid out of said evaporation chamber;
   a first fluid passageway means formed in said filter housing;
   said first fluid passageway means interconnecting said filter housing and said space below said evaporation plate;
   a second fluid passageway means formed in said evaporation plate;
   said second fluid passageway means interconnecting said space and said top surface of said evaporation plate;
   a chimney means formed in said evaporation plate and projecting upwardly therefrom towards said open top, said second passageway means being formed in said chimney means so that fluid exiting said chimney means flows in a thin film over side walls of said chimney means and over said evaporation plate, thereby enhancing evaporation of volatile contaminants in said fluid;
   means for increasing the surface area of said evaporation plate, said surface area increasing means comprising a pair of insert members, each of which has an apex adjacent said open top and sloping side walls that descend from said apex to said top surface of said evaporation plate, each of said insert members being positioned adjacent said chimney means so that fluid flowing out of said second passageway is constrained to flow over said insert members prior to flowing onto said top of said evaporation plate;
   said chimney means comprising a pair of semicircular in configuration chimney members that are positioned in concentric relation to a center of said evaporation plate;
   said evaporation plate including a central hub protruding upwardly towards said open top that is positioned radially inwardly of said pair of chimney members and wherein said insert members are diametrically opposed to one another and are positioned radially inwardly of said chimney members and radially outwardly of said central hub.

2. The device of claim 1, wherein said means for heating said evaporation plate comprises a first well means formed centrally in said central hub of said evaporation plate, a heating element disposed within said first well means, and a second well means formed in said central hub, said second well means being formed in closely spaced relation to said first well means, radially outwardly thereof, a temperature sensor means slidably disposed within said second well means, said heating element conductively coupled to a source of power, and said temperature sensor means conductively coupled to a means for controlling current flow from said source of power to said heating element so that the temperature and pressure in said evaporation chamber is controllable.

3. The device of claim 2, wherein said vapor outlet means comprises a vapor port formed in said closure means, said vapor port providing open fluid communication between said evaporation chamber and an ambient environment external to said device so that evaporated contaminants may escape from said evaporation chamber.

4. The device of claim 3, wherein said outlet means for directing fluid out of said evaporation chamber comprises a fluid return port formed in a side wall of said canister so that reclaimed fluid may exit said device, said fluid return port being disposed in open communication with said evaporation chamber.

5. The device of claim 4, further comprising latch means for releasably securing said closure means to said canister.

6. The device of claim 5, further comprising plural, circumferentially spaced lobe members that extend radially outwardly with respect to said closure means, said latch means including link members that engage said lobes and which have a cam over center construction that locks said closure means in closing relation to said canister when in their over center position.

7. The device of claim 1, wherein said filter media comprises a filter mesh material of a first predetermined thickness positioned within said filter housing in overlying relation adjacent to a bottom wall of said filter housing located furthest from said open top, a fine filter material of a second predetermined thickness positioned within said filter housing in overlying relation adjacent to said filter mesh material and an ultra-fine filter material of a third predetermined thickness positioned within said filter housing in overlying relation adjacent to said fine filter material.

8. The device of claim 1, further comprising a pair of concentric, annular seals positioned between said evaporation plate and said filter housing to constrain fluid flowing through and exiting said first passageway means to flow through and exit said second passageway.

9. The device of claim 1, wherein said central hub is formed integrally with said evaporation plate and is externally threaded at its uppermost part furthest from said top surface, wherein said closure means has a downwardly extending central hub, wherein an internally threaded bore is formed in said downwardly extending central hub, and wherein threads of said internally threaded bore screw threadedly engage the external threads formed on said evaporation plate central hub when the closure means is disposed in closing relation to said canister.

10. The device of claim 9, further comprising gimbal means for maintaining said device in a substantially horizontal plane independently of the orientation of a support surface to which said device is mounted.

11. The device of claim 10, wherein said evaporation plate includes a convex floor facing said open top so that fluid flowing thereover flows radially outwardly under the influence of gravity.

12. A fluid reclamation device comprising a canister having an open top, a filter housing positioned within said canister, said filter housing containing filter media therein, said canister including inlet means for directing fluid into said filter housing, an evaporation plate positioned within said canister in overlying relation to said filter housing adjacent said open top, a closure means for closing the open top of said canister, an evaporation chamber defined by a space between said closure means and said evaporation plate, fluid passage means for directing filtered fluid from said filter housing to said evaporation chamber, said closure means including vapor outlet means for venting vapor from said evaporation chamber, and a heating element positioned within said evaporation plate for directly heating it, said canister including outlet means for directing fluid out of said evaporation chamber, said evaporation plate having an upstanding central hub that is centrally bored to provide a first well means for receiving said heating element therein, said central hub being integrally formed with the evaporation plate, and said central hub being externally threaded to screw threadedly engage said closure means.

13. The device of claim 12, wherein said fluid concluded passage means comprises a pair of upstanding chimney members that are integrally formed with said evaporation plate, that are arcuate in configuration, and that are positioned on opposite sides of said central hub.

14. The device of claim 13, further comprising a pair of insert members positioned between said central hub and said chimney members, each of said insert members having an apex and sidewalls that slope downwardly therefrom, and each of said insert members being provided to increase the effective surface area of said evaporation plate to thereby enhance the amount of evaporation of said fluid that takes place within said evaporation chamber.

15. The device of claim 12, further comprising a second well means formed in said central hub, said second well means being formed in closely spaced relation to said first well means, radially outwardly thereof, a temperature sensor means disposed within said second well means, said heating element being conductively coupled to a source of power, and said temperature sensor means being conductively coupled to a means for controlling current flow from said source of power so that the temperature and pressure of gases within said evaporation chamber is controllable.

16. The device of claim 12, further comprising gimbal means for maintaining said device in a substantially horizontal plane independently of the orientation of a support surface to which said device is mounted.

17. The device of claim 12, wherein said evaporation plate includes a convex floor facing said open top so that fluid flowing thereover flows radially outwardly under the influence of gravity.

* * * * *